(12) United States Patent
Park et al.

(10) Patent No.: US 10,571,002 B1
(45) Date of Patent: Feb. 25, 2020

(54) POWER TRANSMISSION APPARATUS FOR VEHICLE

(71) Applicants: HYUNDAI MOTOR COMPANY, Seoul (KR); KIA MOTORS CORPORATION, Seoul (KR)

(72) Inventors: Juhyeon Park, Suwon-si (KR); Seongwook Ji, Gunpo-si (KR); Hyun Sik Kwon, Seoul (KR); Ilhan Yoo, Jeollanam-do (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/202,500

(22) Filed: Nov. 28, 2018

(30) Foreign Application Priority Data

Aug. 22, 2018 (KR) ........................ 10-2018-0098123

(51) Int. Cl.
*F16H 37/04* (2006.01)

(52) U.S. Cl.
CPC ..... *F16H 37/042* (2013.01); *F16H 2037/048* (2013.01); *F16H 2200/006* (2013.01); *F16H 2200/0047* (2013.01); *F16H 2200/0073* (2013.01); *F16H 2200/0086* (2013.01); *F16H 2200/0091* (2013.01); *F16H 2200/2007* (2013.01); *F16H 2200/2041* (2013.01)

(58) Field of Classification Search
None
See application file for complete search history.

(56) References Cited

U.S. PATENT DOCUMENTS

| | | | | |
|---|---|---|---|---|
| 4,289,044 A | * | 9/1981 | Dorpmund | F16H 47/085 475/50 |
| 4,916,980 A | * | 4/1990 | Asada | F16H 3/66 475/281 |
| 5,030,187 A | * | 7/1991 | Asada | F16H 3/66 475/278 |
| 5,383,822 A | * | 1/1995 | Pierce | F16H 3/66 475/281 |
| 5,692,988 A | * | 12/1997 | Beim | F16H 3/666 475/280 |
| 5,836,850 A | * | 11/1998 | Raghavan | F16H 3/666 475/286 |

(Continued)

*Primary Examiner* — Colby M Hansen
(74) *Attorney, Agent, or Firm* — Brinks Gilson & Lione

(57) ABSTRACT

A power transmission apparatus includes: an input shaft, an output gear; a compound planetary gear set including a first planetary gear set including first, second and third rotation elements, and a second planetary gear set including fourth, fifth and sixth rotation elements; a first shaft fixedly connected with the first rotation element and the fourth rotation element and selectively connected with the input shaft; a second shaft fixedly connected with the fifth rotation element, and selectively connected with the input shaft and a transmission housing; a third shaft fixedly connected with the second rotation element, the sixth rotation element and the output gear; a fourth shaft fixedly connected with the third rotation element; an intermediate shaft; a first gear set transmitting the torque from the input shaft to the intermediate shaft; and a second gear set selectively transmitting the torque from the intermediate shaft to the fourth shaft.

15 Claims, 6 Drawing Sheets

(56) References Cited

U.S. PATENT DOCUMENTS

| | | | | |
|---|---|---|---|---|
| 5,876,300 A * | 3/1999 | Moroto | ............... | F16H 3/66 475/275 |
| 5,951,432 A * | 9/1999 | Wehking | ............ | F16H 3/666 475/280 |
| 5,997,429 A * | 12/1999 | Raghavan | ............ | F16H 3/66 475/280 |
| 6,022,288 A * | 2/2000 | Cho | ................ | F16H 3/66 475/276 |
| 6,056,665 A * | 5/2000 | Raghavan | .......... | F16H 3/666 475/280 |
| 6,110,069 A * | 8/2000 | Taniguchi | .......... | F16H 3/663 475/271 |
| 8,617,023 B1 * | 12/2013 | Noh | ................ | F16H 3/66 475/207 |

* cited by examiner

FIG. 2

| Shift-stage | Engaging elements | | | | |
|---|---|---|---|---|---|
| | C1 | C2 | C3 | B1 | B2 |
| FD1 | ● | | | | ● |
| FD2 | | ● | | | ● |
| FD3 | ● | ● | | | |
| FD4 | | ● | ● | | |
| FD5 | ● | | ● | | |
| REV | ● | | | ● | |

FIG. 4

| Shift-stage | Engaging elements | | | | | |
|---|---|---|---|---|---|---|
| | C1 | C2 | C3 | C4 | B1 | B2 |
| FD1 | ● | | | | | ● |
| FD2 | | | | ● | | ● |
| FD3 | | ● | | | | ● |
| FD4 | | ● | | ● | | |
| FD5 | ● | ● | | | | |
| FD6 | | ● | ● | | | |
| FD7 | ● | | ● | | | |
| FD8 | | | ● | ● | | |
| REV1 | ● | | | | ● | |
| REV2 | | | | ● | ● | |

FIG. 6

| Shift-stage | Engaging elements | | | | | | |
|---|---|---|---|---|---|---|---|
| | C1 | C2 | C3 | C4 | C5 | B1 | B2 |
| FD1 | | | | | ● | | ● |
| FD2 | ● | | | | | | ● |
| FD3 | | | | ● | | | ● |
| FD4 | | ● | | | | | ● |
| FD5 | | ● | | ● | | | |
| FD6 | ● | ● | | | | | |
| FD7 | | ● | | | ● | | |
| FD8 | | ● | ● | | | | |
| FD9 | | | ● | | ● | | |
| FD10 | ● | | ● | | | | |
| FD11 | | | ● | ● | | | |
| REV1 | | | | | ● | ● | |
| REV2 | ● | | | | | ● | |
| REV3 | | | | ● | | ● | |

POWER TRANSMISSION APPARATUS FOR VEHICLE

CROSS-REFERENCE TO RELATED APPLICATION

This application claims priority to and the benefit of Korean Patent Application No. 10-2018-0098123, filed on Aug. 22, 2018, the entire contents of which are incorporated herein by reference.

FIELD

The present disclosure relates to a power transmission apparatus for a vehicle.

BACKGROUND

The statements in this section merely provide background information related to the present disclosure and may not constitute prior art.

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of a power transmission apparatus having more shift stages, it is important for better efficiency to be derived by a smaller number of parts.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for a vehicle provided with one compound planetary gear set having four shafts having advantages of realizing shift-stages and providing better performance and fuel efficiency of a vehicle.

A power transmission apparatus for a vehicle according to various exemplary form of the present disclosure may include: an input shaft receiving an input torque of an engine; an output gear outputting an output torque; a compound planetary gear set including a first planetary gear set having first, second and third rotation elements, and a second planetary gear set having fourth, fifth and sixth rotation elements; a first shaft fixedly connected with the first rotation element and the fourth rotation element and selectively connected with the input shaft; a second shaft fixedly connected with the fifth rotation element, selectively connected with the input shaft and selectively connected with a transmission housing; a third shaft fixedly connected with the second rotation element, the sixth rotation element and the output gear; a fourth shaft fixedly connected with the third rotation element and selectively connected with the transmission housing; an intermediate shaft parallel to the input shaft; a first gear set transmitting the torque from the input shaft to the intermediate shaft; and a second gear set selectively transmitting the torque from the intermediate shaft to the fourth shaft.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

The power transmission apparatus may further include two clutches selectively connecting a corresponding pair among the input shaft, the first, second, third and fourth shafts, and the intermediate shaft, and two brakes selectively connecting a corresponding shaft selected among the input shaft, the first, second, third and fourth shafts, and the intermediate shaft to the housing.

The two clutches may include a first clutch arranged between the input shaft and the first shaft and a second clutch arranged between the input shaft and the second shaft, and the two brake may include a first brake arranged between the second shaft and the transmission housing and a second brake arranged between the fourth shaft and the transmission housing.

The first planetary gear set may be a single pinion planetary gear set, the first rotational element is a first sun gear, the second rotational element is a first planet carrier, and the third rotational element is a first ring gear and the second planetary gear set may be a single pinion planetary gear set, the fourth rotational element is a second sun gear, the fifth rotational element is a second planet carrier, and the sixth rotational element is a second ring gear.

The first gear set may include a first drive gear and a first driven gear, the first drive gear fixedly connected with the input shaft, and the first driven gear fixedly connected with the intermediate shaft and externally gear-meshed with the first drive gear, and the second gear set may include a second drive gear and a second driven gear, the second drive gear exteriorly disposed with the intermediate shaft without rotational interference and selectively connected with the intermediate shaft, and the second driven gear fixedly connected with the fourth shaft and externally gear-meshed with the second drive gear.

The power transmission apparatus may further include a third clutch selectively connecting the intermediate shaft and the second drive gear.

Gear ratios of the first gear set and the second gear set are configured to increase a rotation speed of the input shaft and to output the increased rotation speed to the fourth shaft.

The power transmission apparatus may further include a third gear set disposed for selectively transmitting a torque of the intermediate shaft to the first shaft.

The third gear set may include a third drive gear and a third driven gear, the third drive gear exteriorly disposed with the intermediate shaft without rotational interference and selectively connected with the intermediate shaft, and the third driven gear fixedly connected the first shaft and externally gear-meshed with the third drive gear.

The power transmission apparatus may further include a fourth clutch selectively connecting the intermediate shaft and the third drive gear.

A gear ratio of the third gear set may be the same as the gear ratio of the second gear set.

The power transmission apparatus may further include a fourth gear set disposed for selectively transmitting the torque of the intermediate shaft to the first shaft.

The fourth gear set may include a fourth drive gear and a fourth driven gear, the fourth drive gear exteriorly disposed with the intermediate shaft without rotational interference and selectively connected with the intermediate shaft, and the fourth driven gear fixedly connected the first shaft and externally gear-meshed with the fourth drive gear.

The power transmission apparatus may further include a fifth clutch selectively connecting the intermediate shaft and the fourth drive gear.

A gear ratio of the fourth gear set may be set for decreasing a rotation speed of the input shaft and outputting to the first shaft.

The present disclosure has been made in an effort to provide a power transmission apparatus for a vehicle provided with one compound planetary gear set having four shafts having advantages of realizing shift-stages and providing better performance and fuel efficiency of a vehicle.

A power transmission apparatus for a vehicle according to a first exemplary form enables shift-stages of forward five speeds and one reverse speed by applying one compound planetary gear set including four shafts.

Accordingly multi-stages may be enabled with simpler structure and reduced weight, thereby improving installability and fuel consumption.

A power transmission apparatus for a vehicle according to a second exemplary form further employs one gear set to the first exemplary form, and enables shift-stages of forward eight speeds and two reverse speeds.

A power transmission apparatus for a vehicle according to a third exemplary form further employs one gear set to the second exemplary form, and enables shift-stages of forward eleven speeds and three reverse speeds.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a shifting operational chart for a power transmission apparatus for a vehicle according to a first exemplary form of the present disclosure;

FIG. 4 is a shifting operational chart for a power transmission apparatus for a vehicle according to a second exemplary form of the present disclosure;

FIG. 6 is a shifting operational chart for a power transmission apparatus for a vehicle according to a third exemplary form of the present disclosure.

Figure 1:
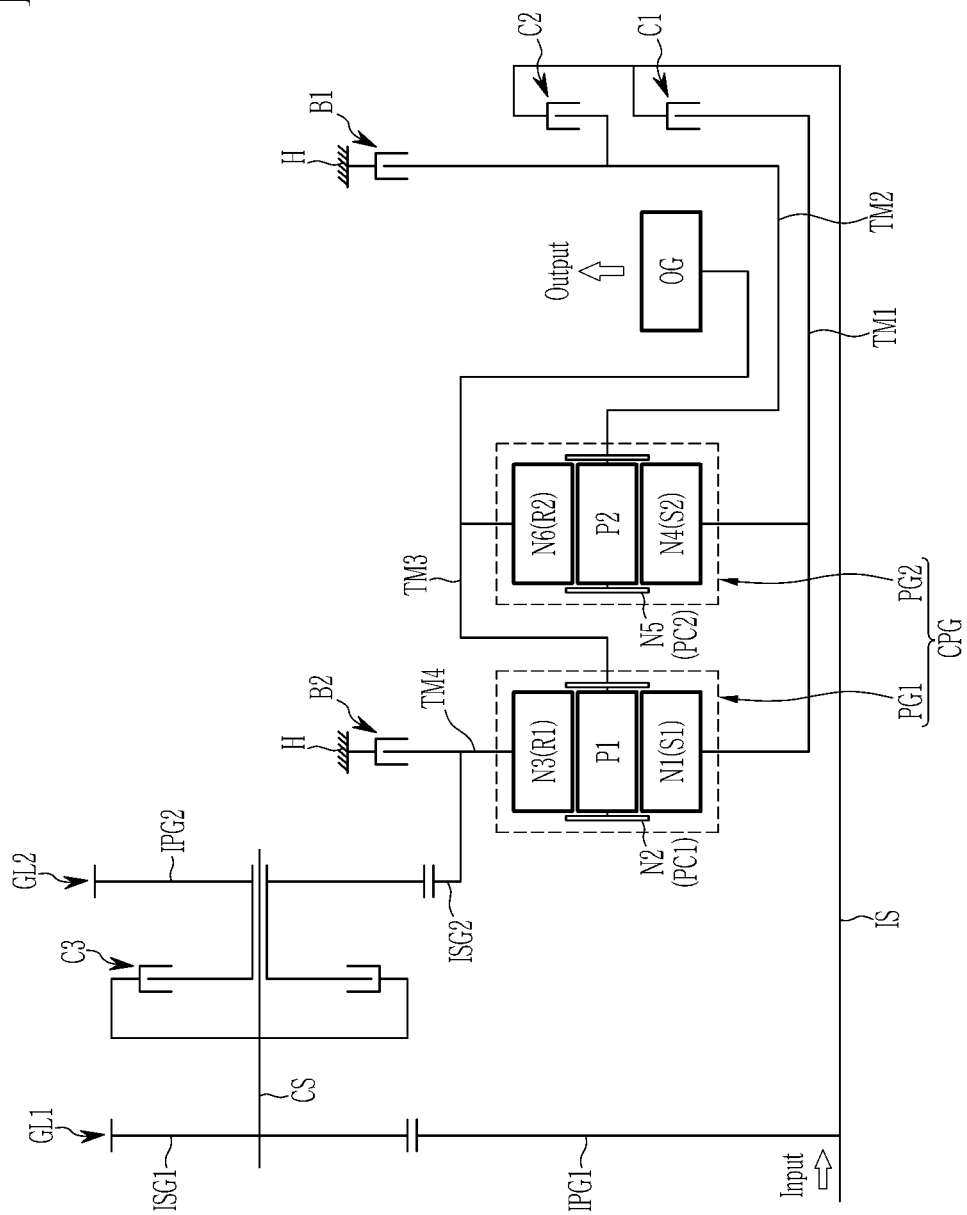
FIG. 1 is a schematic view of a power transmission apparatus for a vehicle according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown.

As those skilled in the art would realize, the described forms may be modified in various different ways, all without departing from the spirit or scope of the present disclosure. The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a power transmission apparatus for a vehicle according to a first exemplary form of the present disclosure.

Referring to FIG. 1, a power transmission apparatus includes: an input shaft IS, an output gear OG, a compound planetary gear set CPG including first and second planetary gear sets PG1 and PG2 forming four shafts TM1 to TM4, engagement element including three clutches C1, C2, and C3 and two brakes B1 and B2, an intermediate shaft CS and first and second gear sets GL1 and GL2.

The input shaft IS is an input member and the torque from a crankshaft of an engine, after being torque-converted through a torque converter, is input into the input shaft IS.

The output shaft OS is an output member and transmits driving torque received from the compound planetary gear set CPG to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The first rotation element N1 is fixedly connected with the fourth rotation element N4 and the second rotation element N2 is fixedly connected with the sixth rotation element N6 and the compound planetary gear set includes four shafts TM1 to TM4.

The four shaft TM1 to TM4 will be described in further detail.

The first shaft TM1 is fixedly connected with the first rotation element N1 (first sun gear S1) and the fourth rotation element N4 (second sun gear S2) and selectively connected with the input shaft IS acting as an input element.

The second shaft TM2 is fixedly connected with the fifth rotation element N5 (second planet carrier PC2), selectively connected with the input shaft IS acting as an input element and selectively connected with a transmission housing H acting as a fixing element.

The third shaft TM3 is fixedly connected with the second rotation element N2 (first planet carrier PC1) and the sixth rotation element N6 (second ring gear R2) and fixedly connected with the output gear OG acting as an output element.

The fourth shaft TM4 is fixedly connected with the third rotation element N3 (first ring gear R1) and selectively connected with a transmission housing H acting as a fixing element.

In addition, the fourth shaft TM4 is selectively connected with the input shaft IS.

The intermediate shaft CS is disposed in parallel with the input shaft IS. And intermediate shaft CS receives the torque of the input shaft IS through the first gear set GL1 and selectively transmits to the fourth shaft TM4 through the second gear set GL2.

The first gear set GL1 includes a first drive gear IPG1 and a first driven gear ISG1, the first drive gear IPG1 is fixedly connected with the input shaft IS, and the first driven gear ISG1 is fixedly connected with the intermediate shaft CS and externally gear-meshed with the first drive gear IPG1.

The second gear set GL2 includes a second drive gear IPG2 and a second driven gear ISG2, the second drive gear IPG2 is exteriorly disposed with the intermediate shaft CS without rotational interference and selectively connected with the intermediate shaft CS, and the second driven gear ISG2 is fixedly connected with the fourth shaft TM4 and externally gear-meshed with the second drive gear IPG2.

Gear ratios of the first gear set GL1 and the second gear set GL2 are set for increasing a rotation speed of the input shaft IS transmitted through the first shaft TM1 and the second shaft TM2 and outputting the increased rotation speed to the fourth shaft TM4.

The power transmission apparatus further includes two clutches selectively connecting a corresponding pair of the shafts and two brakes selectively connecting a corresponding shaft to the housing H.

The engagement elements of the two clutches C1 and C2 and the two brakes B1 and B2 are arranged as follows.

The first clutch C1 is arranged between the input shaft IS and the first shaft TM and selectively connects the input shaft IS and the first shaft TM.

The second clutch C2 is arranged between the input shaft IS and the second shaft TM2 and selectively connects the input shaft IS and the second shaft TM2.

The first brake B1 is arranged between the second shaft TM2 and the transmission housing H and selectively connects the second shaft TM2 and the transmission housing H.

The second brake B2 is arranged between the fourth shaft TM4 and the transmission housing H and selectively connects the fourth shaft TM4 and the transmission housing H.

The power transmission apparatus further includes a third clutch C3 arranged between the intermediate shaft CS and the second drive gear IPG2 selectively connecting the intermediate shaft CS and the second drive gear IPG2.

The engagement elements of the first, second and third clutches C1, C2 and C3 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

FIG. 2 is a shifting operational chart for a power transmission apparatus for a vehicle according to a first exemplary form of the present disclosure, and the power transmission apparatus for a vehicle according to a first exemplary form performs shifting operation as follows.

[The Forward First Speed]

In the forward first speed shift-stage FD1, the first clutch C1 and the second brake B2 are operated.

In a state that the input shaft IS is connected with the first shaft TM1 by the operation of the first clutch C1, the torque of the engine is input to the first shaft TM1.

And the fourth shaft TM4 acts as a fixed element by the operation of the second brake B2, therefore, the torque of the input shaft IS is shifted into the forward first speed shift-stage FD1, and the forward first speed shift-stage FD1 is output through the output gear OG connected to the third shaft TM3.

[The Forward Second Speed]

In the forward second speed shift-stage FD2, the second clutch C2 and the second brake B2 are operated.

In a state that the input shaft IS is connected with the second shaft TM2 by the operation of the second clutch C2, the torque of the engine is input to the second shaft TM2.

And the fourth shaft TM4 acts as a fixed element by the operation of the second brake B2, therefore, the torque of the input shaft IS is shifted into the forward second speed shift-stage FD2, and the forward second speed shift-stage FD2 is output through the output gear OG connected to the third shaft TM3.

[The Forward Third Speed]

In the forward third speed shift-stage FD3, the first clutch C1 and the second clutch C2 are operated.

In a state that the input shaft IS is connected with the first shaft TM1 and the second shaft TM2 by the operations of the first and second clutches C1 and C2, the torque of the engine is input to the first shaft TM1 and the second shaft TM2.

Then, the compound planetary gear set CPG including the first and second planetary gear sets PG1 and PG2 entirely rotates and the torque received at the first shaft TM1 and the second shaft TM2 is outputted as inputted, thereby realizing the forward third speed shift-stage FD3 and outputting through the output gear OG connected with the third shaft TM3.

[The Forward Fourth Speed]

In the forward fourth speed shift-stage FD4, the second clutch C2 and the third clutch C3 are operated.

In a state that the input shaft IS is connected with the second shaft TM2 by the operation of the second clutch C2 and the intermediate shaft CS is connected with the second drive gear IPG2 by the operation of the third clutch C3, the torque of the engine is input to the second shaft TM2, and simultaneously input to the fourth shaft TM4 through the first gear set GL1, the intermediate shaft CS and the second gear set GL2.

While the second shaft TM2 is transmitted the same rotation speed of the input shaft IS, the fourth shaft TM4 is transmitted increased rotation speed due to the gear ratio of the first and second gear sets GL1 and GL2.

According to a speed difference between the second shaft TM2 and the fourth shaft TM4, the compound planetary gear set CPG shifts the torque of the input shaft IS, and the forward fourth speed shift-stage FD4 is output through the output gear OG connected to the third shaft TM3.

[The Forward Fifth Speed]

In the forward fifth speed shift-stage FD5, the first clutch C1 and the third clutch C3 are operated.

In a state that the input shaft IS is connected with the first shaft TM1 by the operation of the first clutch C1 and the intermediate shaft CS is connected with the second drive gear IPG2 by the operation of the third clutch C3, the torque of the engine is input to the first shaft TM1, and simultaneously input to the fourth shaft TM4 through the first gear set GL1, the intermediate shaft CS and the second gear set GL2.

While the first shaft TM1 is transmitted the same rotation speed of the input shaft IS, the fourth shaft TM4 is transmitted increased rotation speed due to the gear ratio of the first and second gear sets GL1 and GL2.

According to a speed difference between the first shaft TM1 and the fourth shaft TM4, the compound planetary gear set CPG shifts the torque of the input shaft IS, and the forward fifth speed shift-stage FD5 is output through the output gear OG connected to the third shaft TM3.

[The Reverse Speed]

In the reverse speed REV, the first clutch C1 and the first brake B1 are operated.

In a state that the input shaft IS is connected with the first shaft TM1 by the operation of the first clutch C1, the torque of the engine is input to the first shaft TM1.

And the second shaft TM2 acts as a fixed element by the operation of the first brake B1, therefore, the torque of the input shaft IS is shifted, the reverse speed REV is output through the output gear OG connected to the third shaft TM3.

The power transmission apparatus according to the first exemplary form of the present disclosure provided with the compound planetary gear set CPG forming the four shafts TM1 to TM4 may realize the forward fifth speeds and one reverse speed shift-stages by rotating the first and second shafts TM1 and TM2 with the same rotation speed of the input shaft IS, by acting the third shaft TM3 as an output member, and by transmitting increased rotation speed to the fourth shaft TM4.

And the power transmission apparatus for a vehicle according to a first exemplary form may be enabled with simpler structure and reduced weight, thereby improving installability and fuel consumption.

Figure 3:
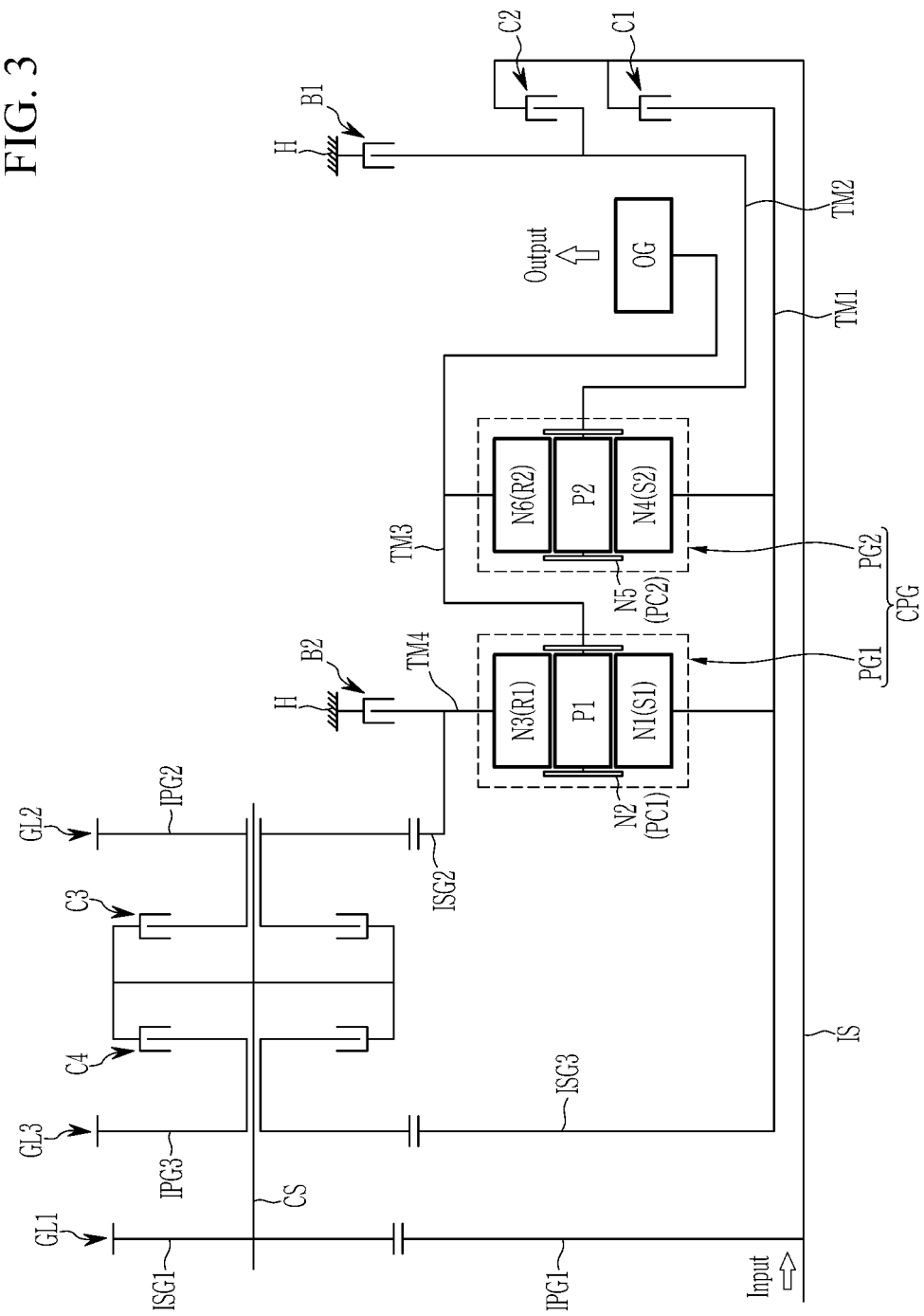
FIG. 3 is a schematic view of a power transmission apparatus for a vehicle according to a second exemplary form of the present disclosure.

FIG. 3 is a schematic view of a power transmission apparatus for a vehicle according to a second exemplary form of the present disclosure.

Referring to FIG. 3, in comparison with the first exemplary form, a second exemplary form further includes a third gear set GL3 such that a vehicle applied with the power transmission apparatus may be enabled with forward eighth speeds and two reverse speeds by further transmitting the torque of the input shaft IS to the first shaft TM1 through the first gear set GL1, the intermediate shaft CS and the third gear set GL3.

The third gear set GL3 includes a third drive gear IPG3 and a third driven gear ISG3, the third drive gear IPG3 is exteriorly disposed with the intermediate shaft CS without rotational interference and selectively connected with the intermediate shaft CS, and the third driven gear ISG3 is fixedly connected the first shaft TM12 and externally gear-meshed with the third drive gear IPG3.

The power transmission apparatus further includes a fourth clutch C4 selectively connecting the intermediate shaft CS and the third drive gear IPG3 and a gear ratio of the third gear set GL3 is the same as the gear ratio of the second gear set GL2.

The fourth clutch C4 may be realized as a multi-plate hydraulic pressure friction device that is frictionally engaged by hydraulic pressure, however, it should not be understood to be limited thereto, since various other configuration that are electrically controllable may be available.

FIG. 4 is a shifting operational chart for a power transmission apparatus for a vehicle according to a second exemplary form of the present disclosure, and the power transmission apparatus for a vehicle according to a second exemplary form performs shifting operation as follows.

[The Forward First Speed]

In the forward first speed shift-stage FD1, the first clutch C1 and the second brake B2 are operated.

In a state that the input shaft IS is connected with the first shaft TM1 by the operation of the first clutch C1, the torque of the engine is input to the first shaft TM1.

And the fourth shaft TM4 acts as a fixed element by the operation of the second brake B2, therefore, the torque of the input shaft IS is shifted into the forward first speed shift-stage FD1, and the forward first speed shift-stage FD1 is output through the output gear OG connected to the third shaft TM3.

[The Forward Second Speed]

In the forward second speed shift-stage FD2, the fourth clutch C4 and the second brake B2 are operated.

In a state that the intermediate shaft CS is connected with the third drive gear IPG3 by the operation of the fourth clutch C4, the torque of the engine is input to the first shaft TM1 through the first gear set GL1, the intermediate shaft CS, and the third gear set GL3.

Then the first shaft TM1 is transmitted a further increased rotation speed than in the forward first speed due to the gear ratio of the first and third gear sets GL1 and GL3.

While the fourth shaft TM4 acts as a fixed element by the operation of the second brake B2, the torque of the input shaft IS is shifted, and the forward second speed shift-stage FD2 is output through the output gear OG connected to the third shaft TM3.

[The Forward Third Speed]

In the forward third speed shift-stage FD3, the second clutch C2 and the second brake B2 are operated.

In a state that the input shaft IS is connected with the second shaft TM2 by the operation of the second clutch C2, the torque of the engine is input to the second shaft TM2.

And the fourth shaft TM4 acts as a fixed element by the operation of the second brake B2, therefore, the torque of the input shaft IS is shifted, and the forward third speed shift-stage FD3 is output through the output gear OG connected to the third shaft TM3.

[The Forward Fourth Speed]

In the forward fourth speed shift-stage FD4, the second clutch C2 and the fourth clutch C4 are operated.

In a state that the input shaft IS is connected with the second shaft TM2 by the operation of the second clutch C2 and the intermediate shaft CS is connected with the third drive gear IPG3 by the operation of the fourth clutch C4, the torque of the engine is input to the second shaft TM2, and simultaneously input to the first shaft TM1 through the first gear set GL1, the intermediate shaft CS and the third gear set GL3.

While the second shaft TM2 is transmitted the same rotation speed of the input shaft IS, the first shaft TM1 is transmitted increased rotation speed due to the gear ratio of the first and third gear sets GL1 and GL3.

According to a speed difference between the second shaft TM2 and the first shaft TM1, the compound planetary gear set CPG shifts the torque of the input shaft IS, and the forward fourth speed shift-stage FD4 is output through the output gear OG connected to the third shaft TM3.

[The Forward Fifth Speed]

In the forward fifth speed shift-stage FD5, the first clutch C1 and the second clutch C2 are operated.

In a state that the input shaft IS is connected with the first shaft TM1 and the second shaft TM2 by the operations of the first and second clutches C1 and C2, the torque of the engine is input to the first shaft TM1 and the second shaft TM2.

Then, the compound planetary gear set CPG including the first and second planetary gear sets PG1 and PG2 entirely rotates and the torque received at the first shaft TM1 and the second shaft TM2 is outputted as inputted, thereby realizing the forward fifth speed shift-stage FD5 and outputting through the output gear OG connected with the third shaft TM3.

[The Forward Sixth Speed]

In the forward sixth speed shift-stage FD6, the second clutch C2 and the third clutch C3 are operated.

In a state that the input shaft IS is connected with the second shaft TM2 by the operation of the second clutch C2 and the intermediate shaft CS is connected with the second drive gear IPG2 by the operation of the third clutch C3, the torque of the engine is input to the second shaft TM2, and simultaneously input to the fourth shaft TM4 through the first gear set GL1, the intermediate shaft CS and the second gear set GL2.

While the second shaft TM2 is transmitted the same rotation speed of the input shaft IS, the fourth shaft TM4 is transmitted increased rotation speed due to the gear ratio of the first and second gear sets GL1 and GL2.

According to a speed difference between the second shaft TM2 and the fourth shaft TM4, the compound planetary gear set CPG shifts the torque of the input shaft IS, and the forward sixth speed shift-stage FD6 is output through the output gear OG connected to the third shaft TM3.

[The Forward Seventh Speed]

In the forward seventh speed shift-stage FD7, the first clutch C1 and the third clutch C3 are operated.

In a state that the input shaft IS is connected with the first shaft TM1 by the operation of the first clutch C1 and the intermediate shaft CS is connected with the second drive gear IPG2 by the operation of the third clutch C3, the torque of the engine is input to the first shaft TM1 and simultaneously input to the fourth shaft TM4 through the first gear set GL1, the intermediate shaft CS and the second gear set GL2.

While the first shaft TM1 is transmitted the same rotation speed of the input shaft IS, the fourth shaft TM4 is transmitted increased rotation speed due to the gear ratio of the first and second gear sets GL1 and GL2.

According to a speed difference between the first shaft TM1 and the fourth shaft TM4, the compound planetary gear set CPG shifts the torque of the input shaft IS, and the forward seventh speed shift-stage FD7 is output through the output gear OG connected to the third shaft TM3.

[The Forward Eighth Speed]

In the forward eighth speed shift-stage FD8, the third clutch C3 and the fourth clutch C4 are operated.

In a state that the intermediate shaft CS is connected with the second drive gear IPG2 by the operation of the third clutch C3 and the intermediate shaft CS is connected with the third drive gear IPG3 by the operation of the fourth clutch C4, the torque of the engine is input to the fourth shaft TM4 through the first gear set GL1, the intermediate shaft CS and the second gear set GL2 and simultaneously input to the first shaft TM1 through the first gear set GL1, the intermediate shaft CS and the third gear set GL3.

In this case, the same increased rotation speed is transmitted to the first shaft TM1 and the fourth shaft TM4 simultaneously so that the compound planetary gear set CPG entirely rotates. And the compound planetary gear set CPG outputs the rotation speed as inputted and the forward eighth speed shift-stage FD8 is output through the output gear OG connected to the third shaft TM3.

[The Reverse First Speed]

In the reverse first speed shift-stage REV1, the first clutch C1 and the first brake B1 are operated.

In a state that the input shaft IS is connected with the first shaft TM1 by the operation of the first clutch C1, the torque of the engine is input to the first shaft TM1.

And the second shaft TM2 acts as a fixed element by the operation of the first brake B1, therefore, the torque of the input shaft IS is shifted, the reverse first speed REV1 is output through the output gear OG connected to the third shaft TM3.

[Reverse Second Speed]

In the reverse second speed shift-stage REV2, the fourth clutch C4 and the first brake B1 are operated.

In a state that the intermediate shaft CS is connected with the third drive gear IPG3 by the operation of the fourth clutch C4, torque of the engine is input to the first shaft TM1 through the first gear set GL1, the intermediate shaft CS and the third gear set GL3.

Then first shaft TM1 receives a further increased speed than in the reverse first speed due to the gear ratio of the first and the third gear set GL1 and GL3.

In addition, while the second shaft TM2 acts as a fixed element by the operation of the first brake B1, the torque of the input shaft IS is shifted, the reverse second speed REV2 is output through the output gear OG connected to the third shaft TM3.

The second exemplary form further includes the third gear set GL3 and may be enabled with forward eighth speeds and two reverse speeds.

Also, the power transmission apparatus for a vehicle according to the second exemplary form may be enabled with simpler structure and reduced weight, thereby improving installability and fuel consumption.

Figure 5:
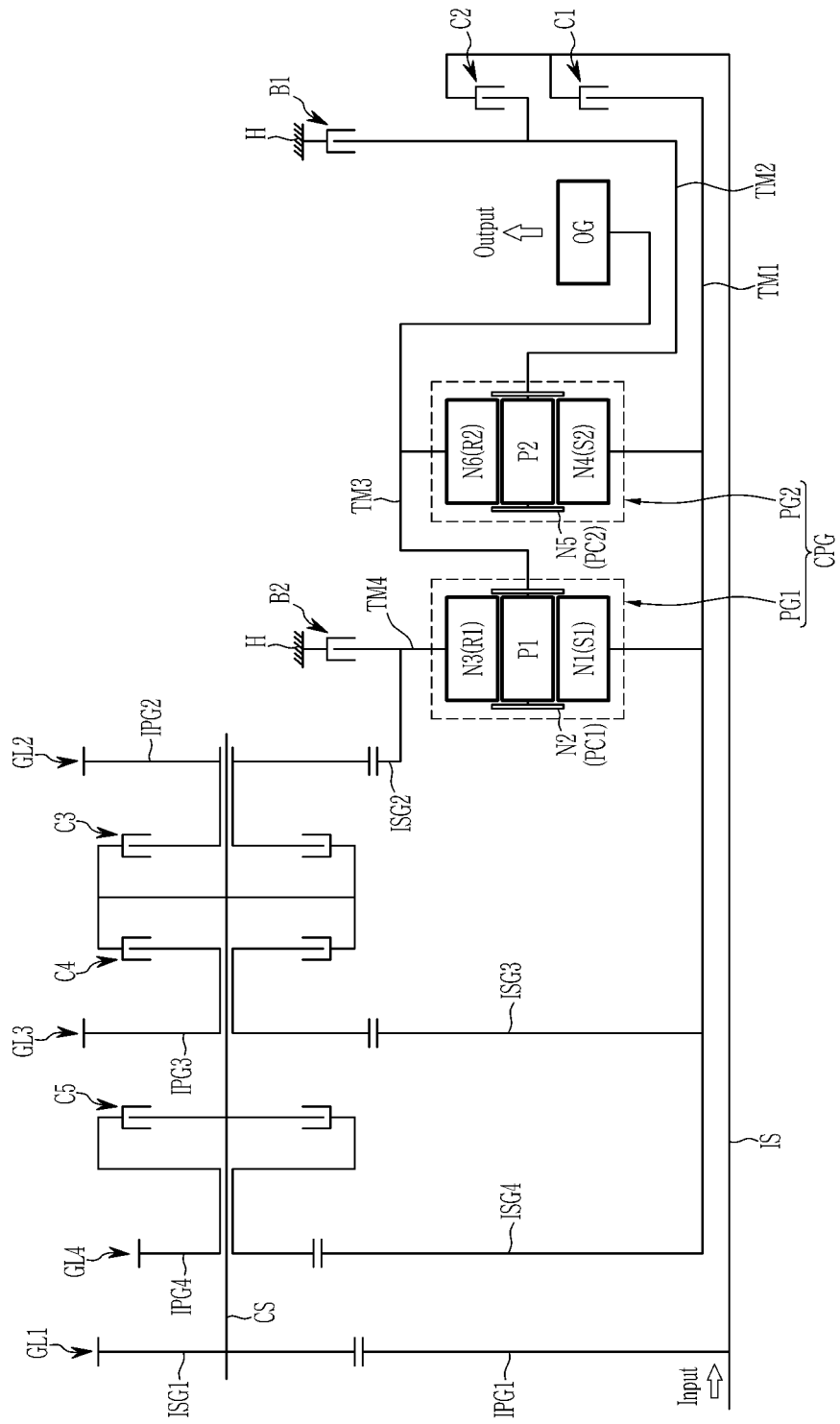
FIG. 5 is a schematic view of a power transmission apparatus for a vehicle according to a third exemplary form of the present disclosure.

FIG. 5 is a schematic view of a power transmission apparatus for a vehicle according to a third exemplary form of the present disclosure.

Referring to FIG. 5, in comparison with the second exemplary form, a third exemplary form further includes a fourth gear set GL4 such that a vehicle applied with the power transmission apparatus may be enabled with forward eleventh speeds and three reverse speeds by further transmitting the torque of the input shaft IS to the first shaft TM1 through the first gear set GL1, the intermediate shaft CS and the fourth gear set GL4.

The fourth gear set GL4 includes a fourth drive gear IPG4 and a fourth driven gear ISG4, the fourth drive gear IPG4 is exteriorly disposed with the intermediate shaft CS without rotational interference and selectively connected with the intermediate shaft CS, and the fourth driven gear ISG4 is fixedly connected the first shaft TM1 and externally gear-meshed with the fourth drive gear IPG4.

The power transmission apparatus further includes a fifth clutch C5 selectively connecting the intermediate shaft CS and the fourth drive gear IPG4. A gear ratio of the fourth gear set GL4 is set for decreasing a rotation speed of the input shaft IS and outputting to the first shaft TM1.

The fifth clutch C5 may be realized as a multi-plate hydraulic pressure friction device that is frictionally engaged by hydraulic pressure, however, it should not be understood to be limited thereto, since various other configuration that are electrically controllable may be available.

FIG. 4 is a shifting operational chart for a power transmission apparatus for a vehicle according to a third exemplary form of the present disclosure, and the power transmission apparatus for a vehicle according to a third exemplary form performs shifting operation as follows.

[The Forward First Speed]

In the forward first speed shift-stage FD1, the fifth clutch C5 and the second brake B2 are operated.

In a state that the intermediate shaft CS is connected with the fourth drive gear IPG4 by the operation of the fifth clutch C5, the rotation speed of the input shaft IS is reduced and transmitted to the first shaft TM1 through the first gear set GL1, the intermediate shaft CS and the fourth gear set GL4.

And the fourth shaft TM4 acts as a fixed element by the operation of the second brake B2, therefore, the torque of the input shaft IS is shifted into the forward first speed shift-stage FD1, and the forward first speed shift-stage FD1 is output through the output gear OG connected to the third shaft TM3.

[The Forward Second Speed]

In the forward second speed shift-stage FD2, the first clutch C1 and the second brake B2 are operated.

In a state that the input shaft IS is connected with the first shaft TM1 by the operation of the first clutch C1, the torque of the engine is input to the first shaft TM1.

And the fourth shaft TM4 acts as a fixed element by the operation of the second brake B2, therefore, the torque of the input shaft IS is shifted into the forward second speed shift-stage FD2, output through the output gear OG connected to the third shaft TM3.

[The Forward Third Speed]

In the forward third speed shift-stage FD3, the fourth clutch C4 and the second brake B2 are operated.

In a state that the intermediate shaft CS is connected with the third drive gear IPG3 by the operation of the fourth clutch C4, the torque of the engine is input to the first shaft TM1 through the first gear set GL1, the intermediate shaft CS, and the third gear set GL3.

Then the first shaft TM1 is transmitted a further increased speed than in the forward second speed due to the gear ratio of the first and third gear sets GL1 and GL3.

While the fourth shaft TM4 acts as a fixed element by the operation of the second brake B2, the torque of the input shaft IS is shifted, and the forward third speed shift-stage FD3 is output through the output gear OG connected to the third shaft TM3.

[The Forward Fourth Speed]

In the forward fourth speed shift-stage FD4, the second clutch C2 and the second brake B2 are operated.

In a state that the input shaft IS is connected with the second shaft TM2 by the operation of the second clutch C2, the torque of the engine is input to the second shaft TM2.

And the fourth shaft TM4 acts as a fixed element by the operation of the second brake B2, therefore, the torque of the input shaft IS is shifted, and the forward fourth speed shift-stage FD4 is output through the output gear OG connected to the third shaft TM3.

[The Forward Fifth Speed]

In the forward fifth speed shift-stage FD5, the second clutch C2 and the fourth clutch C4 are operated.

In a state that the input shaft IS is connected with the second shaft TM2 by the operation of the second clutch C2 and the intermediate shaft CS is connected with the third drive gear IPG3 by the operation of the fourth clutch C4, the torque of the engine is input to the second shaft TM2, and simultaneously input to the first shaft TM1 through the first gear set GL1, the intermediate shaft CS and the third gear set GL3.

While the second shaft TM2 is transmitted the same rotation speed of the input shaft IS, the first shaft TM1 is transmitted increased rotation speed due to the gear ratio of the first and third gear sets GL1 and GL3.

According to a speed difference between the second shaft TM2 and the first shaft TM1, the compound planetary gear set CPG shifts the torque of the input shaft IS, and the forward fifth speed shift-stage FD5 is output through the output gear OG connected to the third shaft TM3.

[The Forward Sixth Speed]

In the forward sixth speed shift-stage FD6, the first clutch C1 and the second clutch C2 are operated.

In a state that the input shaft IS is connected with the first shaft TM1 and the second shaft TM2 by the operations of the first and second clutches C1 and C2, the torque of the engine is input to the first shaft TM1 and the second shaft TM2.

Then, the compound planetary gear set CPG including the first and second planetary gear sets PG1 and PG2 entirely rotates and the torque received at the first shaft TM1 and the second shaft TM2 is outputted as inputted, thereby realizing the forward sixth speed shift-stage FD6 and outputting through the output gear OG connected with the third shaft TM3.

[The Forward Seventh Speed]

In the forward seventh speed shift-stage FD7, the second clutch C2 and the fifth clutch C5 are operated.

In a state that the input shaft IS is connected with the second shaft TM2 by the operations of second clutch C2 and the intermediate shaft CS is connected with the fourth drive gear IPG4 by the operation of the fifth clutch C5, the rotation speed of the input shaft IS is input to the second shaft TM2 and simultaneously to the first shaft TM1 through the first gear set GL1, the intermediate shaft CS and the fourth gear set GL4.

While the same rotation speed of input shaft IS is transmitted to the second shaft TM2, the rotation speed of the input shaft IS is reduced and transmitted to the first shaft TM1 through the first gear set GL1, the intermediate shaft CS and the fourth gear set GL4.

According to a speed difference between the second shaft TM2 and the first shaft TM1, the compound planetary gear set CPG shifts the torque of the input shaft IS, and the forward seventh speed shift-stage FD7 is output through the output gear OG connected to the third shaft TM3.

[The Forward Eighth Speed]

In the forward eighth speed shift-stage FD8, the second clutch C2 and the third clutch C3 are operated.

In a state that the input shaft IS is connected with the second shaft TM2 by the operation of the second clutch C2 and the intermediate shaft CS is connected with the second drive gear IPG2 by the operation of the third clutch C3, the torque of the engine is input to the second shaft TM2, and simultaneously input to the fourth shaft TM4 through the first gear set GL1, the intermediate shaft CS and the second gear set GL2.

While the second shaft TM2 is transmitted the same rotation speed of the input shaft IS, the fourth shaft TM4 is transmitted increased rotation speed due to the gear ratio of the first and second gear sets GL1 and GL2.

According to a speed difference between the second shaft TM2 and the fourth shaft TM4, the compound planetary gear set CPG shifts the torque of the input shaft IS, and the forward eighth speed shift-stage FD8 is output through the output gear OG connected to the third shaft TM3.

[The Forward Ninth Speed]

In the forward ninth speed shift-stage FD9, the third clutch C3 and the fifth clutch C5 are operated.

In a state that the intermediate shaft CS is connected with the second drive gear IPG2 by the operation of the third clutch C3 and the intermediate shaft CS is connected with the fourth drive gear IPG4 by the operation of the fifth clutch C5, the torque of the engine is input to the fourth shaft TM4 through the first gear set GL1, the intermediate shaft CS, and the second gear set GL2 and simultaneously input to the first shaft TM1 through the first gear set GL1, the intermediate shaft CS, and the fourth gear set GL4.

While the fourth shaft TM4 is transmitted increased rotation speed due to the gear ratio of the first and second gear sets GL1 and GL2, the rotation speed of the input shaft IS is reduced and transmitted to the first shaft TM1 due to the gear ratio of the first and the fourth gear sets GL1 and GL4.

According to a speed difference between the first shaft TM1 and the fourth shaft TM4, the compound planetary gear set CPG shifts the torque of the input shaft IS, and the forward ninth speed shift-stage FD9 is output through the output gear OG connected to the third shaft TM3.

[The Forward Tenth Speed]

In the forward tenth speed shift-stage FD10, the first clutch C1 and the third clutch C3 are operated.

In a state that the input shaft IS is connected with the first shaft TM1 by the operation of the first clutch C1 and the intermediate shaft CS is connected with the second drive gear IPG2 by the operation of the third clutch C3, the torque of the engine is input to the first shaft TM1 and simultaneously input to the fourth shaft TM4 through the first gear set GL1, the intermediate shaft CS and the second gear set GL2.

While the first shaft TM1 is transmitted the same rotation speed of the input shaft IS, the fourth shaft TM4 is transmitted increased rotation speed due to the gear ratio of the first and second gear sets GL1 and GL2.

According to a speed difference between the first shaft TM1 and the fourth shaft TM4, the compound planetary gear set CPG shifts the torque of the input shaft IS, and the forward tenth speed shift-stage FD10 is output through the output gear OG connected to the third shaft TM3.

[The Forward Eleventh Speed]

In the forward eleventh speed shift-stage FD11, the third clutch C3 and the fourth clutch C4 are operated.

In a state that the intermediate shaft CS is connected with the second drive gear IPG2 by the operation of the third clutch C3 and the intermediate shaft CS is connected with the third drive gear IPG3 by the operation of the fourth clutch C4, the torque of the engine is input to the fourth shaft TM4 through the first gear set GL1, the intermediate shaft CS and the second gear set GL2 and simultaneously input to the first shaft TM1 through the first gear set GL1, the intermediate shaft CS and the third gear set GL3.

In this case, the same increased rotation speed is transmitted to the first shaft TM1 and the fourth shaft TM4 simultaneously so that the compound planetary gear set CPG entirely rotates. And the compound planetary gear set CPG outputs the rotation speed as inputted and the forward eleventh speed shift-stage FD11 is output through the output gear OG connected to the third shaft TM3.

[Reverse First Speed]

In the reverse first speed shift-stage REV1, the fifth clutch C5 and the first brake B1 are operated.

In a state that the intermediate shaft CS is connected with the second drive gear IPG2 by the operation of the third clutch C3, the torque of the engine is input to the first shaft TM1 through the first gear set GL1, the intermediate shaft CS, and the fourth gear set GL4.

While the second shaft TM2 acts as a fixed element by the operation of the first brake B1, the torque of the input shaft IS is shifted and the reverse first speed REV1 is output through the output gear OG connected to the third shaft TM3.

[Reverse Second Speed]

In the reverse second speed shift-stage REV2, the first clutch C1 and the first brake B1 are operated.

In a state that the input shaft IS is connected with the first shaft TM1 by the operation of the first clutch C1, the torque of the engine is input to the first shaft TM1.

And the second shaft TM2 acts as a fixed element by the operation of the first brake B1, therefore, the torque of the input shaft IS is shifted, the reverse second speed REV2 is output through the output gear OG connected to the third shaft TM3.

[Reverse Third Speed]

In the reverse third speed shift-stage REV3, the fourth clutch C4 and the first brake B1 are operated.

In a state that the intermediate shaft CS is connected with the third drive gear IPG3 by the operation of the fourth clutch C4, torque of the engine is input to the first shaft TM1 through the first gear set GL1, the intermediate shaft CS and the third gear set GL3.

Then first shaft TM1 receives a further increased speed than in the reverse second speed due to the gear ratio of the first and the third gear set GL1 and GL3.

In addition, while the second shaft TM2 acts as a fixed element by the operation of the first brake B1, the torque of the input shaft IS is shifted, the reverse third speed REV3 is output through the output gear OG connected to the third shaft TM3.

The third exemplary form further includes the fourth gear set GL4 and may be enabled with forward eleventh speeds and three reverse speeds.

Also, the power transmission apparatus for a vehicle according to the third exemplary form may be enabled with simpler structure and reduced weight, thereby improving installability and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first, second brake
C1,C2,C3,C4,C5: first, second, third, fourth, fifth clutch
IS: input shaft
OG: output gear
CPG: compound planetary gear set
GL1,GL2,GL3,GL4: first, second, third, fourth gear sets
IPG1,IPG2,IPG3,IPG4: first, second, third, fourth drive gears
ISP1,ISG2,ISG3,ISG4: first, second, third, fourth driven gears
PG1,PG2: first, second planetary gear sets
TM1,TM2,TM3,TM4 . . . first, second, third, fourth shafts

What is claimed is:

1. A power transmission apparatus for a vehicle, the power transmission apparatus comprising:
an input shaft receiving an input torque of an engine;

an output gear outputting an output torque;
a compound planetary gear set including:
  a first planetary gear set having a first rotation element, a second rotation element, and a third rotation element, and
  a second planetary gear set having a fourth rotation element, a fifth rotation element, and a sixth rotation element;
a first shaft fixedly connected with the first rotation element and the fourth rotation element and selectively connected with the input shaft;
a second shaft fixedly connected with the fifth rotation element, selectively connected with the input shaft and selectively connected with a transmission housing;
a third shaft fixedly connected with the second rotation element, the sixth rotation element and the output gear;
a fourth shaft fixedly connected with the third rotation element and selectively connected with the transmission housing;
an intermediate shaft parallel to the input shaft;
a first gear set transmitting the torque from the input shaft to the intermediate shaft; and
a second gear set selectively transmitting the torque from the intermediate shaft to the fourth shaft.

2. The power transmission apparatus of claim 1, further comprising:
  two clutches selectively connecting a corresponding pair among the input shaft, the first, second, third and fourth shafts, and the intermediate shaft; and
  two brakes selectively connecting a corresponding shaft selected among the input shaft, the first, second, third and fourth shafts, and the intermediate shaft to the housing.

3. The power transmission apparatus of claim 2, wherein the two clutches comprises:
  a first clutch arranged between the input shaft and the first shaft; and
  a second clutch arranged between the input shaft and the second shaft, and
  wherein the two brake comprises:
  a first brake arranged between the second shaft and the transmission housing; and
  a second brake arranged between the fourth shaft and the transmission housing.

4. The power transmission apparatus of claim 1, wherein the first planetary gear set is a single pinion planetary gear set, the first rotational element is a first sun gear, the second rotational element is a first planet carrier, and the third rotational element is a first ring gear, and
  wherein the second planetary gear set is a single pinion planetary gear set, the fourth rotational element is a second sun gear, the fifth rotational element is a second planet carrier, and the sixth rotational element is a second ring gear.

5. The power transmission apparatus of claim 1, wherein the first gear set comprises a first drive gear and a first driven gear, the first drive gear fixedly connected with the input shaft, and the first driven gear fixedly connected with the intermediate shaft and externally gear-meshed with the first drive gear, and
  wherein the second gear set comprises a second drive gear and a second driven gear, the second drive gear exteriorly disposed with the intermediate shaft without rotational interference and selectively connected with the intermediate shaft, and the second driven gear fixedly connected with the fourth shaft and externally gear-meshed with the second drive gear.

6. The power transmission apparatus of claim 5, further comprising: a third clutch selectively connecting the intermediate shaft and the second drive gear.

7. The power transmission apparatus of claim 5, wherein gear ratios of the first gear set and the second gear set are configured to increase a rotation speed of the input shaft and output the increased rotation speed to the fourth shaft.

8. The power transmission apparatus of claim 1, further comprising: a third gear set configured to selectively transmit a torque of the intermediate shaft to the first shaft.

9. The power transmission apparatus of claim 8, wherein the third gear set comprises a third drive gear and a third driven gear, the third drive gear exteriorly disposed with the intermediate shaft without rotational interference and selectively connected with the intermediate shaft, and the third driven gear fixedly connected to the first shaft and externally gear-meshed with the third drive gear.

10. The power transmission apparatus of claim 9, further comprising: a fourth clutch selectively connecting the intermediate shaft and the third drive gear.

11. The power transmission apparatus of claim 9, wherein a gear ratio of the third gear set is the same as a gear ratio of the second gear set.

12. The power transmission apparatus of claim 8, further comprising: a fourth gear set configured to selectively transmit the torque of the intermediate shaft to the first shaft.

13. The power transmission apparatus of claim 12, wherein the fourth gear set comprises a fourth drive gear and a fourth driven gear, the fourth drive gear exteriorly disposed with the intermediate shaft without rotational interference and selectively connected with the intermediate shaft, and the fourth driven gear fixedly connected to the first shaft and externally gear-meshed with the fourth drive gear.

14. The power transmission apparatus of claim 12, further comprising: a fifth clutch selectively connecting the intermediate shaft and the fourth drive gear.

15. The power transmission apparatus of claim 12, wherein a gear ratio of the fourth gear set is configured to decreasing a rotation speed of the input shaft and outputting to the first shaft.

* * * * *